(12) United States Patent
Ganesan

(10) Patent No.: US 11,410,783 B1
(45) Date of Patent: Aug. 9, 2022

(54) UNDERGROUND NUCLEAR POWER REACTOR WITH A BLAST MITIGATION CHAMBER

(71) Applicant: Palvannanathan Ganesan, Omaha, NE (US)

(72) Inventor: Palvannanathan Ganesan, Omaha, NE (US)

(*) Notice: Subject to any disclaimer, the term of this patent is extended or adjusted under 35 U.S.C. 154(b) by 0 days.

(21) Appl. No.: 17/183,923

(22) Filed: Feb. 24, 2021

(51) Int. Cl.
| | |
|---|---|
| *G21C 9/008* | (2006.01) |
| *G21C 9/00* | (2006.01) |
| *G21C 13/087* | (2006.01) |
| *G21C 15/18* | (2006.01) |

(52) U.S. Cl.
CPC ........... *G21C 9/001* (2013.01); *G21C 13/087* (2013.01); *G21C 15/18* (2013.01)

(58) Field of Classification Search
CPC ....... G21C 9/001; G21C 13/087; G21C 15/18
USPC .......................................... 376/283, 285, 287
See application file for complete search history.

(56) References Cited

U.S. PATENT DOCUMENTS

| | | | | |
|---|---|---|---|---|
| 3,466,227 A | * | 9/1969 | Finch | G21C 9/00 376/287 |
| 3,755,076 A | | 8/1973 | Lindsley | |
| 4,032,397 A | * | 6/1977 | Beine | G21C 9/001 376/283 |
| 4,123,325 A | * | 10/1978 | Ichiki | G21C 9/001 376/293 |
| 4,167,087 A | * | 9/1979 | Schabert | G21C 13/00 376/273 |
| 4,971,752 A | | 11/1990 | Parker | |
| 9,378,855 B2 | | 6/2016 | Ganesan | |
| 9,396,823 B2 | | 7/2016 | Ganesan | |
| 9,502,143 B2 | | 11/2016 | Ganesan | |
| 10,170,209 B2 | | 1/2019 | Ganesan | |
| 10,685,751 B2 | | 6/2020 | Ganesan | |
| 10,714,221 B2 | | 7/2020 | Ganesan | |
| 10,748,667 B1 | * | 8/2020 | Alden | G21C 9/001 |
| 2015/0131769 A1 | | 5/2015 | Larrion | |

OTHER PUBLICATIONS

Search Report and Written Opinion in International Application No. PCT/US2021/063082 dated Mar. 28, 2022, 12 pages.

* cited by examiner

*Primary Examiner* — Jack W Keith
*Assistant Examiner* — Daniel Wasil
(74) *Attorney, Agent, or Firm* — Suiter Swantz pc llo

(57) ABSTRACT

An underground nuclear power reactor having a hollow blast tunnel which extends from one end of a containment member which houses a nuclear reactor, heat exchanger, generator, etc. A hollow blast tunnel extends from one end of the containment member with a normally closed door positioned therebetween. The blast tunnel defines a blast chamber having a plurality of spaced-apart debris deflectors positioned therein. The blast chamber has an upper wall with a roof opening formed therein which is selectively closed by a roof portion. If the reactor needs to be repaired or replaced, the door is opened so that the reactor will pass therethrough into the blast chamber and outwardly through the roof opening. If the reactor explodes, the blast therefrom drives the debris therefrom through the door and into the blast chamber where the deflectors reduce the blast force as the debris passes through the blast chamber.

21 Claims, 14 Drawing Sheets

UNDERGROUND NUCLEAR POWER REACTOR WITH A BLAST MITIGATION CHAMBER

BACKGROUND OF THE INVENTION

Field of the Invention

This invention relates to a nuclear power reactor. More particularly, this invention relates to an underground nuclear power reactor. Even more particularly, this invention relates to an underground nuclear power reactor having a blast mitigation chamber connected thereto.

Description of the Related Art

Nuclear power reactor systems have been provided to protect the reactor in the event of war or terrorism. Applicant has previously received several patents which represent significant advances in the nuclear power reactor art. See for example, U.S. Pat. Nos. 9,378,855 B2; 9,396,823 B2; 9,502,143 B2; 10,170,209; 10,685,751 B2; and 10,714,221. However, none of Applicant's prior patents have dealt with a convenient means for removing the nuclear power reactor from its confinement member for service or replacement. Further, none of Applicant's patents or prior art patents of which he is aware are capable of mitigating the blast or explosion of the nuclear power reactor should such blast or explosion occur.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In Applicant's pending application Ser. No. 17/138,217 filed Dec. 30, 2020 entitled DOUBLE CONTAINMENT NUCLEAR POWER REACTOR WITH PASSIVE COOLING AND RADIATION SCRUBBING, an improvement in the art is described. Inasmuch as the instant invention works extremely well with the invention of the pending application, the pending application is disclosed and repeated herein to set the proper background for the instant invention.

The underground nuclear power reactor with which the instant invention is associated includes a containment member having:
  (a) a bottom wall having a first end, a second end, a first side, a second side, an upper side and a lower side;
  (b) an upstanding first end wall having a lower end, an upper end, an inner side, an outer side, a first end and a second end;
  (c) said first end wall extending upwardly from the first end of the bottom wall;
  (d) an upstanding second end wall having a lower end, an upper end, an inner side, an outer side, a first end and a second end;
  (e) the second end wall extending upwardly from the second end of the bottom wall;
  (f) the second end wall of the containment member having a door opening formed therein;
  (g) an upstanding first side wall having a lower end, an upper end, an inner side, an outer side, a first end and a second end;
  (h) the first side wall extending upwardly from the first side of the bottom wall;
  (i) an upstanding second side wall having a lower end, an upper end, an inner side, an outer side, a first end and a second end;
  (j) the second side wall extending upwardly from the second side of the bottom wall;
  (k) an upper wall having a first end, a second end, a first side, a second side, a lower side and an upper side;
  (l) the upper wall extending between said upper ends of the first end wall, the second end wall, the first side wall and the second side wall so that the containment member defines an interior compartment therebetween; and
  (m) the upper wall of the containment member being located below ground level whereby the containment member is completely buried in the ground.

The instant invention includes an elongated and horizontally disposed hollow blast tunnel including a blast chamber which extends from the second end wall of the containment member of the pending application and which includes:
  (a) a bottom wall having a first end, a second end, a first side, a second side, an upper side and a lower side;
  (b) an upstanding first side wall having a lower end, an upper end, an inner side, an outer side, a first end and a second end;
  (c) the first side wall extending upwardly from the first side of the bottom wall;
  (d) an upstanding second side wall having a lower end, an upper end, an inner side, an outer side, a first end and a second end;
  (e) the second side wall extending upwardly from the second side of the bottom wall;
  (f) an upstanding first end wall having a lower end and an upper end;
  (g) the first end wall extending between the first ends of the first and second side walls;
  (h) an upstanding second end wall having a lower end and an upper end;
  (i) the second end wall extending between the second ends of the first and second side walls;
  (j) an upper wall extending over the upper ends of the first end wall, the second end wall, the first side wall and the second side wall;
  (k) the upper wall having a roof opening formed therein which is selectively closed by a roof portion;
  (l) the first end wall of the blast tunnel having a door opening formed therein which communicates with the door opening in the second end wall of the confinement member;
  (m) a door movably positioned in the door opening in said second end wall of the containment member and the door opening in the first end wall of the blast tunnel with the door being movable from a normally closed position to an open position due to blast forces; and
  (n) the door may be also selectively opened to permit the nuclear power reactor to be removed from the containment member for replacement and/or repair.

In the preferred embodiment, the blast tunnel is comprised of concrete. In the preferred embodiment, the deflectors are selectively removably secured to the side walls of the blast tunnel.

A principal object of the invention is to provide a blast mitigation chamber for use with an underground nuclear power reactor.

A further object of the invention is to provide a blast mitigation assembly including a blast chamber which will not only mitigate the blast of an exploding underground nuclear power reactor but which also can be used to enable a reactor to be moved from its underground containment member for repair or replacement.

A further object of the invention is to provide a blast mitigation assembly of the type described which reduces the radiation of an exploded reactor from reaching the atmosphere.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

As stated hereinabove, the specification and drawings of the pending application will be repeated herein with Applicant's instant application being described in detail hereinafter. Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Applicant has previously received U.S. Pat. Nos. 9,378,855 B2; 9,396,823 B2; 9,502,143 B2; 10,170,209; 10,685,751 B2 and 10,714,221 relating to nuclear power reactors. Although Applicant's earlier patents relate to floating nuclear power reactors and the instant invention relates to an underground double containment nuclear power reactor, Applicant hereby incorporates the disclosures of the above-identified patents in their entirety by reference thereto to complete this disclosure if necessary. Further, as used herein, the term fluid may include steam.

Figure 1:
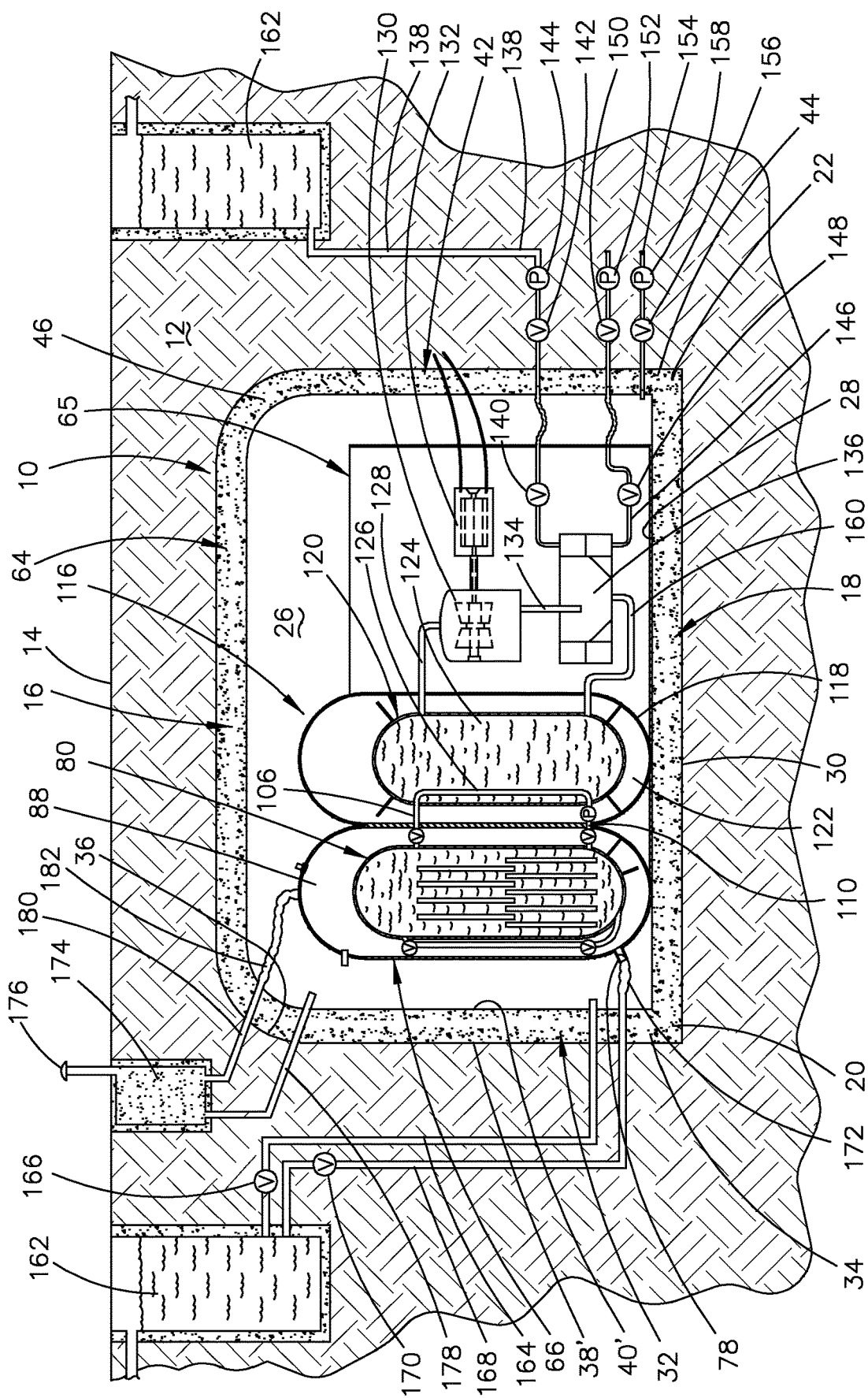
FIG. 1 is a sectional view of the first embodiment of the invention of the pending application.

The underground double containment nuclear power reactor of this invention is referred to by the reference numeral 10 (FIG. 1). The ground in which the underground double containment nuclear power reactor 10 is buried will be referred to by the reference numeral 12 with the ground level or upper surface thereof being referred to by the reference numeral 14.

The underground double containment nuclear power reactor 10 includes a first containment member 16. Containment member 16 includes a bottom wall 18 having a first end 20, a second end 22, a first side 24, a second side 26, an upper side 28 and a lower side 30. An upstanding first end wall 32, having a lower end 34, an upper end 36, a first end 38 and a second end 40. As seen, end wall 32 has an outer side 38' and an inner side 40'. An upstanding second end wall 42, having a lower end 44, an upper end 46, a first end 48 and a second end 50, extends upwardly from end 22 of bottom wall 18. As seen, end wall 42 has an outer side 50' and an inner side 48'.

An upstanding first side wall 52, having a first end 54 and a second end 56, extends upwardly from the first side 24 of bottom wall 18. The end 54 of side wall 52 is joined to the end 38 of end wall 32. The end 56 of side wall 52 is joined to the end 48 of end wall 42.

An upstanding second side wall 58, having a first end 60 and a second end 62, extends upwardly from the second side 26 of bottom wall 18. The end 60 of side wall 58 is joined to the end 40 of end wall 32. The end 62 of side wall 58 is joined to the end 50 of end wall 42.

Figure 3:
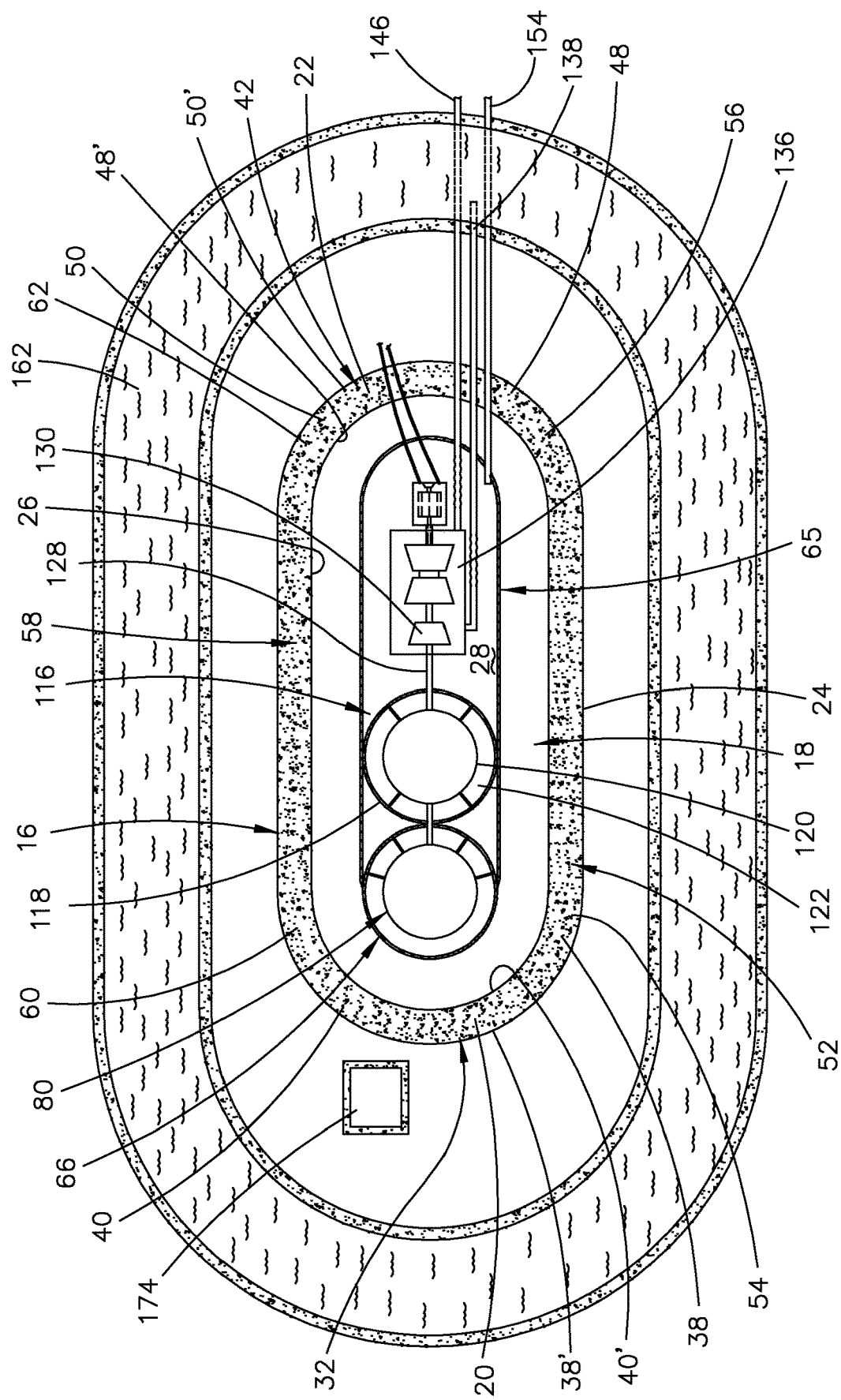
FIG. 3 is a partial sectional top view of the first embodiment of the invention of the pending application.
Figure 3A:
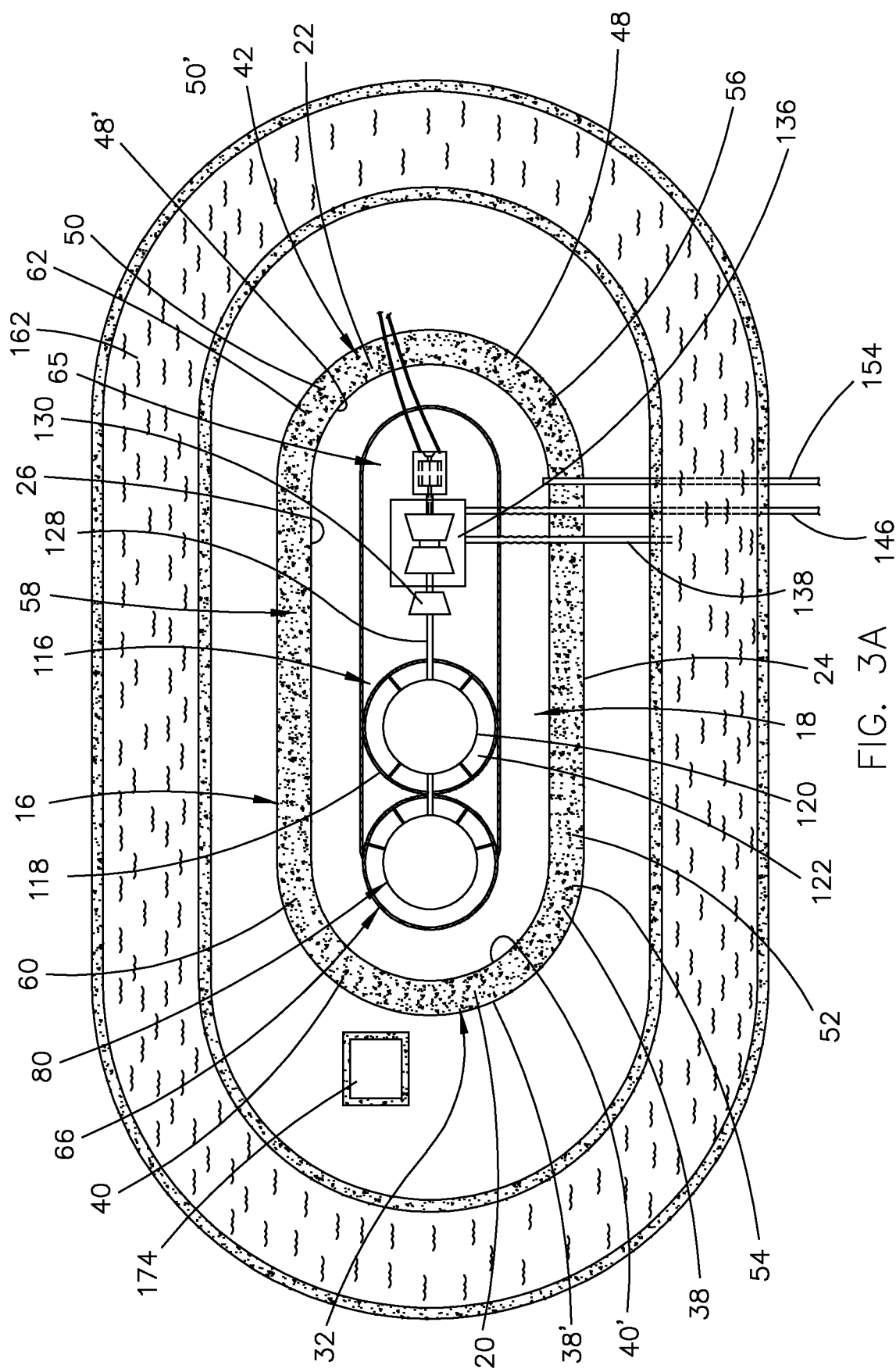
FIG. 3A is a partial sectional top view of the first embodiment of the invention of the pending application wherein certain of the tubes thereof extend through the side of the first containment member rather than the end of the first containment member as depicted in FIG. 3.
Figure 4:
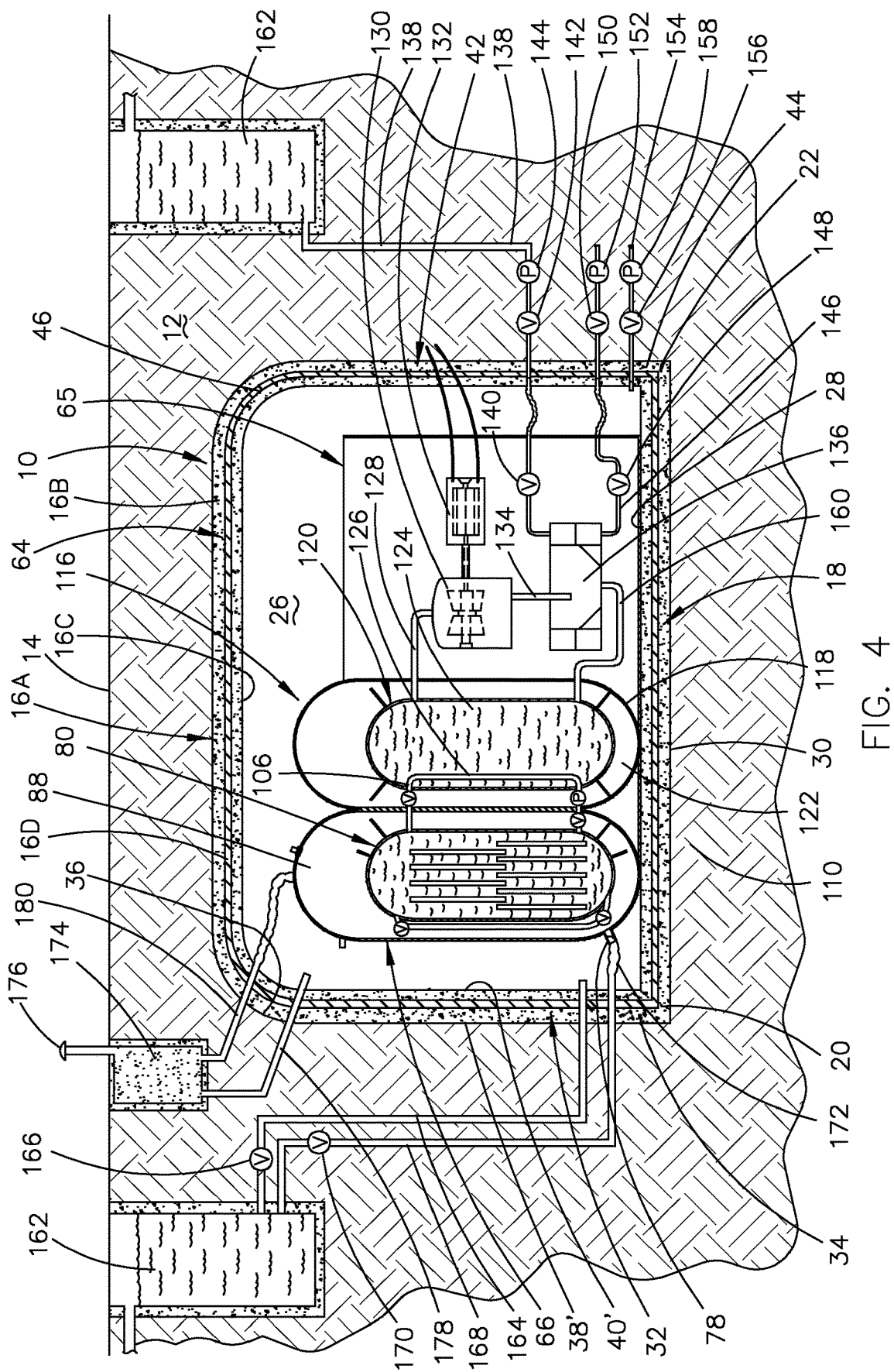
FIG. 4 is a sectional view of a second embodiment of the invention of the pending application which is identical to the first embodiment of the invention of FIG. 1 except that the first containment member is comprised of two layers of concrete having a flexible and water impervious material therebetween.
Figure 5:
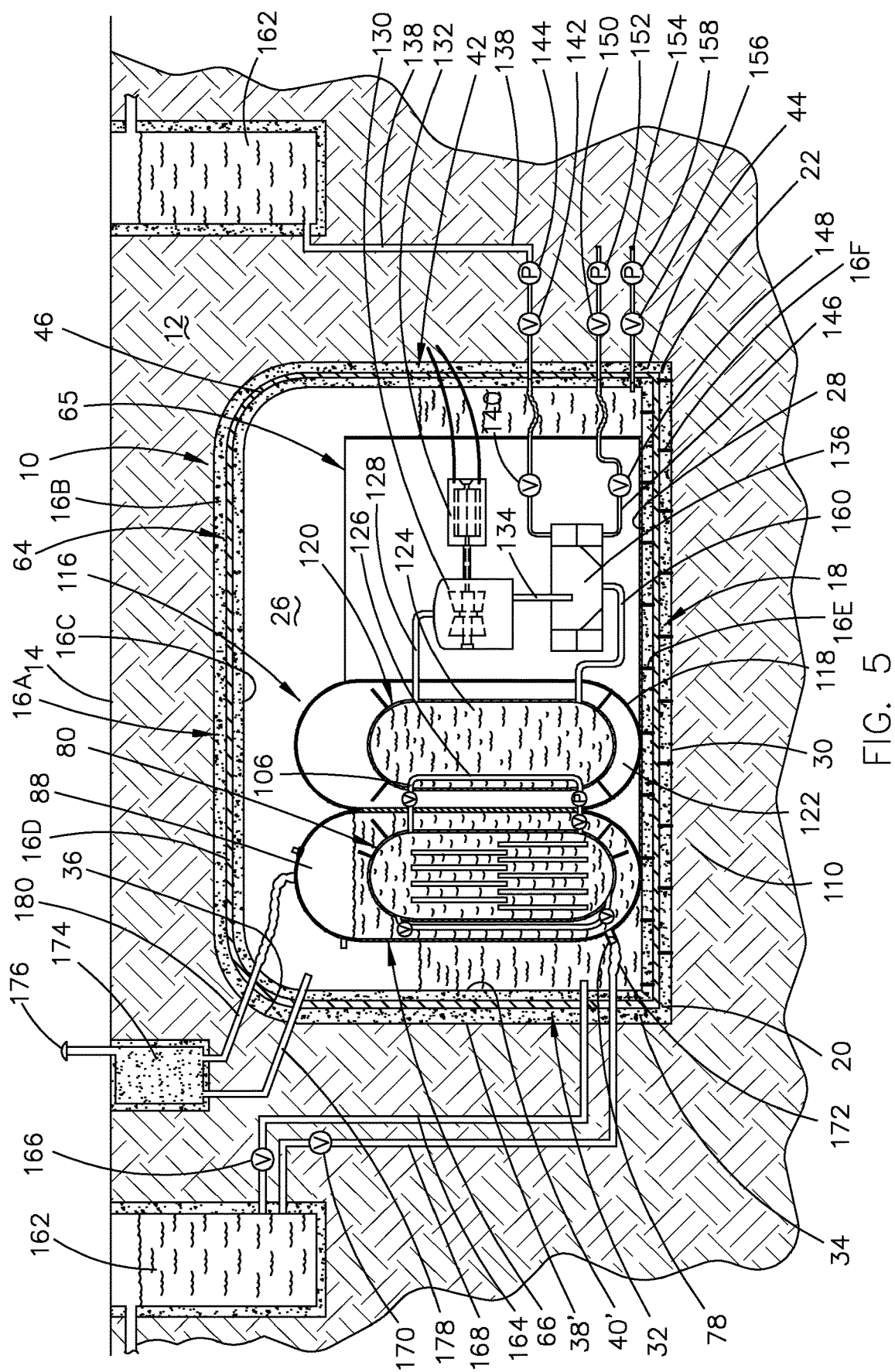
FIG. 5 is a sectional view of a third embodiment of the invention of the pending application which is identical to FIG. 4 except the concrete bottom wall of the first containment member has a plurality of off-set and spaced-apart expansion joints formed in the two layers of concrete.
Figure 6:
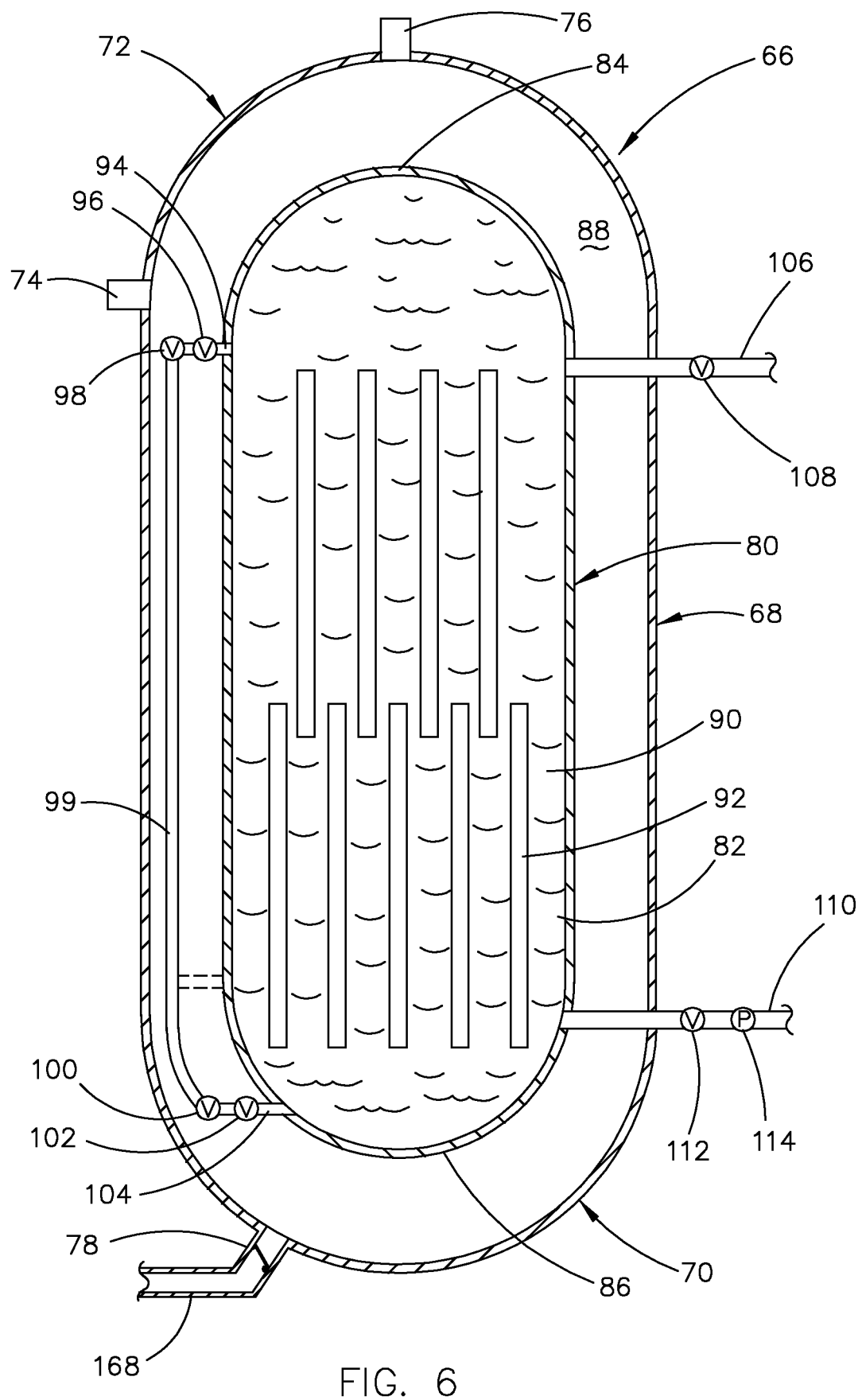
FIG. 6 is a partial vertical sectional view of the second containment member and the reactor vessel therein of the pending application.
Figure 7:
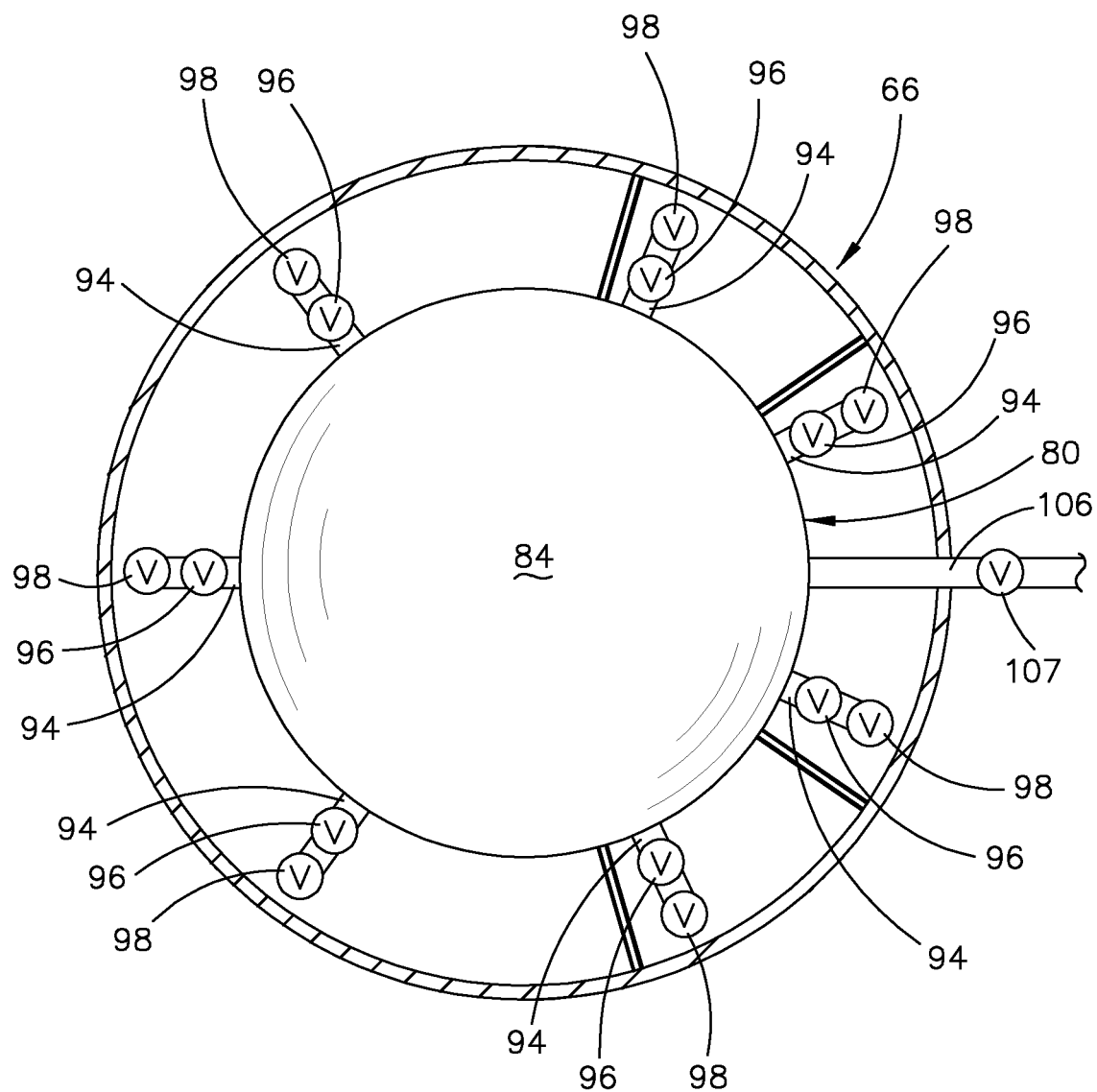
FIG. 7 is a partial horizontal top sectional view of the second containment member having the reactor vessel therein of the pending application.

The numeral 64 refers to the top wall or roof of the first containment member 16 which is positioned on the upper end 36 of end wall 32, the upper end 46 of end wall 42, the upper end of side wall 52 and the upper end of side wall 58 and is joined thereto. As seen, the top wall or roof 64 is located below the upper surface or ground level 14 and is completely buried in the ground 12 which provides protection against air strikes, missile strikes, or other acts of terror or war. As seen in FIGS. 3 and 3A, the containment member 16 may have an oblong configuration as viewed from the upper end thereof or it may have a rectangular shape such as seen in FIG. 1. If the rectangular configuration is employed, rounded portions may be provided on the upper ends of the side walls and end walls of the containment member 16.

The first containment member 16 is preferably comprised of concrete but could be comprised of steel or the like. As will be shown in the drawings, some other versions of the single layer of concrete of FIG. 1 could be employed. The numeral 65 refers to an optional tank or frame which is positioned in the interior of containment member 16. Tank 65 is identical to the barge 32 described and shown in U.S. Pat. No. 10,685,751 and will not be described in detail other than to describe that the tank 65 has a bottom wall, a first end wall, a first side wall, a second side wall, an open second end and an open upper end. Tank 65 is comprised of a metal material such as stainless steel, steel, iron, aluminum or other suitable material.

An upstanding second containment member 66 is positioned in the interior of the first containment member 16 and in the tank 65 as seen in the drawings. Containment member 66 is preferably comprised of steel but could be formed with other materials. Containment member 66 will be described as having a generally cylindrical body section 68, a lower section 70 and an upper section 72. Containment member 66 closes the open second end of the tank 65 just like the nuclear reactor 59 closes one end of the barge 32 in U.S. Pat. Nos. 10,170,209; 10,685,751; and 10,714,221.

Containment member 66 has a water outlet 74 secured thereto in the upper section 72 thereof. Containment member 66 also has an exhaust outlet 76 formed therein in the upper section 72 thereof as will be described in more detail hereinafter. Containment member 66 also has a one-way water inlet opening or pipe 78 formed in the lower section 70 thereof. As seen, the lower end of the containment member 66 is positioned on the upper side of the bottom wall of the tank 65, if the optional tank 65 is utilized, which is positioned on the upper side 28 of bottom wall 18 of containment member 16. If the optional tank 65 is not utilized, the lower end of containment member 66 will be positioned on the upper side 28 of bottom wall 18 of containment member 16.

The numeral 80 refers to a nuclear reactor vessel which is positioned in containment member 66 and which has an interior compartment 82. For purposes of description, reactor vessel 80 will be described as having an upper end 84 and a lower end 86. Reactor vessel 80 is spaced from containment member 66 to define an interior compartment 88 therebetween. Interior compartment 82 of reactor vessel 80 contains fluid 90 and rods 92 in conventional fashion. The water inlet opening 78 is in fluid communication with the interior compartment 88. The water outlet opening 74 is in fluid communication with the interior of containment member 16.

Vessel 80 is provided with a plurality of radially spaced-apart tubes 94 which extend outwardly from reactor vessel 80 in the upper section of reactor vessel 80. Valves 96 and 98 are imposed in each of the tubes 94. An elongated and vertically disposed cooling tube 99 extends downwardly from the outlet side of each of the valves 98 in interior compartment 88. A pair of valves 100 and 102 are imposed in the lower ends of each of the cooling tubes 99. The discharge side of each of the valves 102 is in communication with a pipe 104 which is in communication with the interior compartment 82 of vessel 80.

A tube 106 extends from vessel 80 below the upper end 84 of vessel 80 and extends outwardly through containment member 68 and has a valve 108 imposed therein. A tube 110 extends from vessel 80 at the lower end thereof with the inner end of tube 110 being in fluid communication with the interior compartment 82 of vessel 80. A valve 112 and an electric pump 114 are imposed in tube 110. The reason for having the two valves 96 and 98 connected to each of the tubes 94 is to provide a back-up valve if one of the two valves malfunction. The reason for having the two valves 100 and 102 connected to each of the tubes 104 is to provide a back-up valve if one of the two valves malfunctions.

The number 116 refers to an upstanding heat exchanger which is positioned adjacent containment member 66 as seen in the drawings. Heat exchanger 116 includes an upstanding outer support 118, the lower end of which rests on the bottom wall of the tank 65 if tank 65 is used. If tank 65 is not used, the lower end of the heat exchanger 116 rests on the bottom wall 18 of containment member 16. A vessel 120 is positioned within outer support 118. Outer support 118 and vessel 120 define an interior compartment 122 therebetween. In some cases, the outer support 118 may not be necessary. At any rate, fluid 124 is contained in vessel 120.

The tubes 106 and 110, which extend from the interior of vessel 80, extend outwardly through containment member 66, through the outer support 118 of heat changer 116 and into the interior of vessel 120 and are connected to a vertically disposed tube 126 which is positioned in the interior of vessel 120.

Referring now to the drawings, a tube 128 extends from the upper end of vessel 120, through outer support 118 to a conventional turbine 130 which drives a device 132 such as a generator. A tube 134 extends from turbine 130 to a conventional condenser 136. A water input line 138 extends from condenser 136 and has valves 140 and 142 imposed therein. Line 138 also has an optional pump 144 imposed therein. Line 146 extends from condenser 136 outwardly through end wall 42 of containment member 16 into the ground 12. Line 146 has valves 148 and 150 imposed therein. Line 146 also has an optional pump 152 imposed therein.

The numeral 154 refers to a tube which extends outwardly through end wall 42 of containment member 16 into the ground 12. Tube 154 has a valve 156 imposed therein and an optional pump 158 imposed therein. Tube 160 extends from condenser 136 to the interior compartment 124 of vessel 120 of heat exchanger 116.

The structure of FIG. 3A is identical to the structure of FIG. 3 except that the tubes 138, 146 and 154 go outwardly through the side wall 52 of containment member 16 rather than the end wall 42 of containment member 16.

Line or tube 138 extends from condenser 136 to a source of water 162 which is positioned at ground level 14 and below. Water 162 may be a singular tank or an oblong body of water such as seen in FIGS. 3 and 3A. As seen, the source of water 162 is concrete lined. With respect to line 138, the force of gravity should supply the needed water to condenser 136 but pump 144 ensures that an adequate amount of water will be supplied to condenser 136.

As seen in FIG. 1, line or tube 164 fluidly connects the source of water 162 with the interior of containment member 16. Line 164 has a valve 166 imposed therein. As also seen in FIG. 1, a line or tube 168 fluidly connects the source of water 162 and the inlet pipe 78 to supply cooling water to the interior compartment 88 of containment member 66. A valve 170 is imposed in line 168. Line 168 also includes a flexible or slack portion 172.

The numeral 174 refers to a conventional radiation scrubber having a vent 176. Tube 178 connects radiation scrubber 174 to the interior of containment member 16 as seen in FIG.

1. Line 180 connects radiation scrubber 174 to the outlet pipe 76 at the upper end of containment member 66. Line 180 includes a flexible portion 182 therein.

Figure 2:
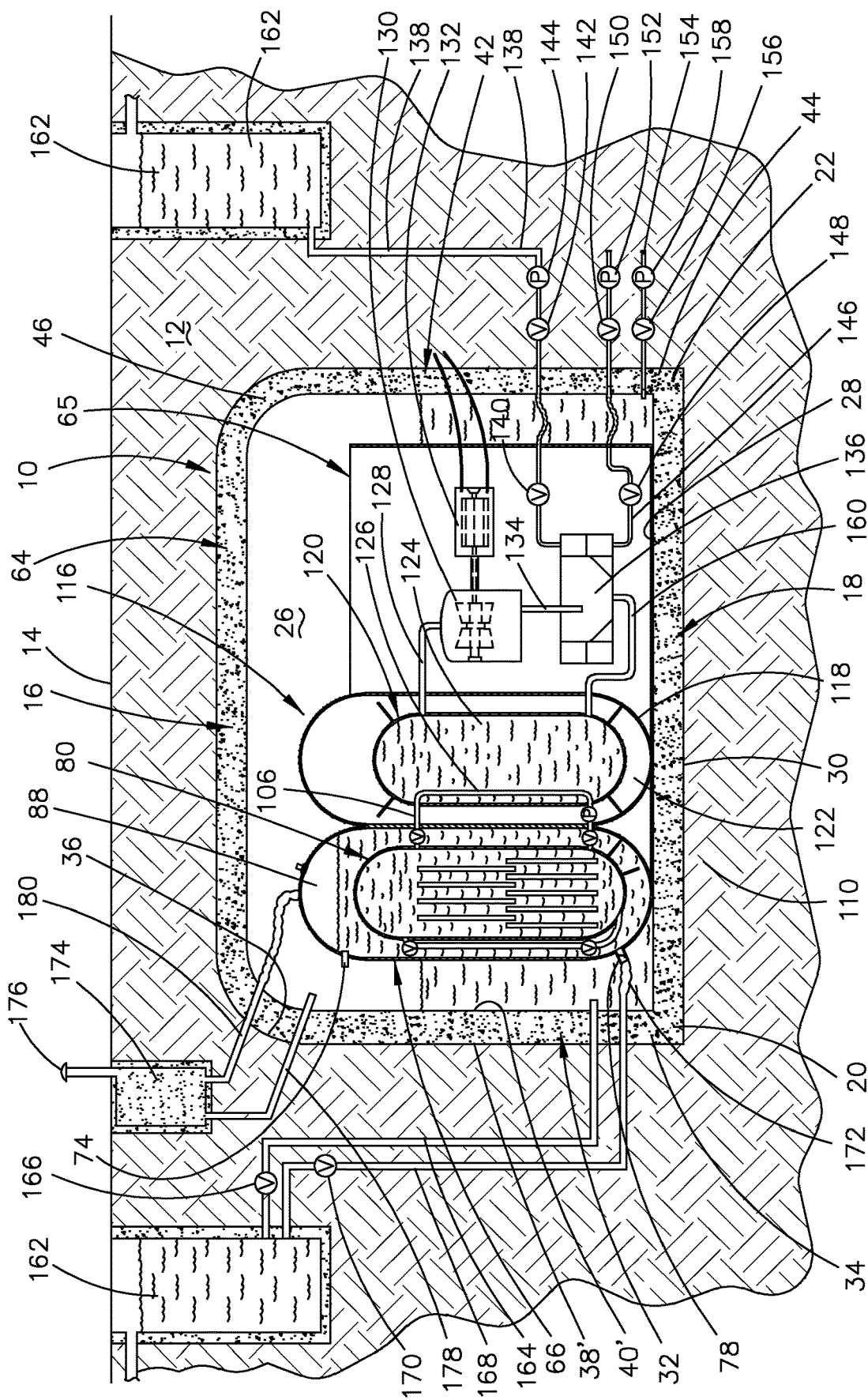
FIG. 2 is a sectional view of the first embodiment of the invention of the pending application wherein cooling water has been supplied to the interior of the second containment member of the invention by gravity flow.

FIG. 2 is identical to FIG. 1 except that cooling water has been supplied to the interior of compartment 88 of containment member 66, by gravity flow, so as to surround reactor vessel 80. Excess water in compartment 88 will flow outwardly from outlet pipe 74 into the interior of containment member 16. Any radiation fumes in the upper part of containment member 16 will pass upwardly to the radiation scrubber 174 by way of line 178. Any radiation fumes in the upper part of interior compartment 88 will pass upwardly to the radiation scrubber 174 by way of line 180.

When the nuclear reactor of this invention is functioning in a conventional manner, as seen in FIG. 1, the valves 166 and 170 in lines 164 and 168 respectively will be closed. The valves 108 and 112 in lines 106 and 110 respectively will be open and pump 114 in line 110 will be active. The heated fluid or steam created in the interior compartment 82 of reactor vessel 80 will be discharged into the heat exchanger 116 by way of the tube 106. The heated fluid therein will pass through tube 106 and valve 108, through tube 126 and outwardly through the tube 110, pump 114 and valve 112 into the interior of compartment 82 of reactor vessel 80 with the flow being aided by the electric pump 114.

When the nuclear reactor of this invention is functioning in a conventional manner, the valves 96, 98, 100 and 102 will be open so that fluid may pass through the cooling tubes 99. If there is a break in one of the tubes 99, the valves 96, 98, 100 and 102 of the associated tubes 99 will close to avoid loss of fluid from the broken tube 99. The reason for having two valves 96 and 98 at the outer end of each of the tubes 94 is for one of the valves functioning as a back-up valve in the event of one of the valves malfunctioning. The same is also true for having two valves 100 and 102 at the lower end of each of the cooling tubes 99.

The heated fluid or steam 124 in vessel 120 in heat exchanger 116 passes through line 128 to turbine 130 to drive the same in conventional fashion. Turbine 130 drives the device 132 in conventional fashion. The fluid or steam within turbine 130 is discharged therefrom into condenser 136 by way of tube 134. The fluid or steam supplied to condenser 136 is returned to the lower end of vessel 120 by line 160.

If the nuclear reactor becomes overheated or over pressurized, the valve 170 in line 168 will be opened to supply water to flood the interior compartment 88 of containment 66 by gravity. Cooling water in the interior compartment 88 will surround the cooling tubes 99. The valves 96, 98, 100 and 102 are normally open and this allows hot fluid from the interior compartment 82 to circulate from the upper end of interior compartment 82 through cooling tubes 99 to the lower end of interior compartment 82. Heat from the hot fluid in the cooling tubes 99 conducts across the wall of cooling tube 99 to the cold water surrounding cooling tube 99. This cools the fluid inside cooling tube 99. As the fluid cools, it becomes denser than hot fluid and drops down to the lower part of vessel 80. Inside the vessel 80, residual heat from the hot rods 92 heats the fluid making the fluid less dense. Less dense fluid raises and moves to the upper section of vessel 80 and enters the upper end of tube 99 which is surrounded by cold water and cools again inside the cooling tubes 99, thereby creating a convection current cycle. The convection current cycle results in cooling the reactor.

If needed, valve 166 may be opened so that cooling water from the source of water 162 will flood the interior of containment member 16. The level of water within the first containment member 16 will be controlled by the valve 156 and pump 158 in line 154.

In summary, the new features of the invention of the pending application with respect to Applicant's earlier patents are set forth below:

1. The fact that the nuclear reactor of the instant invention is completely underground, protects the nuclear reactor from air strikes, missile strikes, terrorism, etc.
2. The instant invention provides a greater level of radiation protection for the public due to the radiation scrubbing of radiation fumes being discharged from the reactor.
3. The simplified passive cooling system supplies cooling water to the interior of the second containment member thereby cooling the cooling loops therein.
4. The reactor is positioned on the floor of the tank, if the tank is utilized, which is positioned on the floor of the first containment member.
5. If the tank is not utilized, the reactor is positioned on the floor of the first containment member.
6. A plurality of back-up valves are provided.

Figure 8:
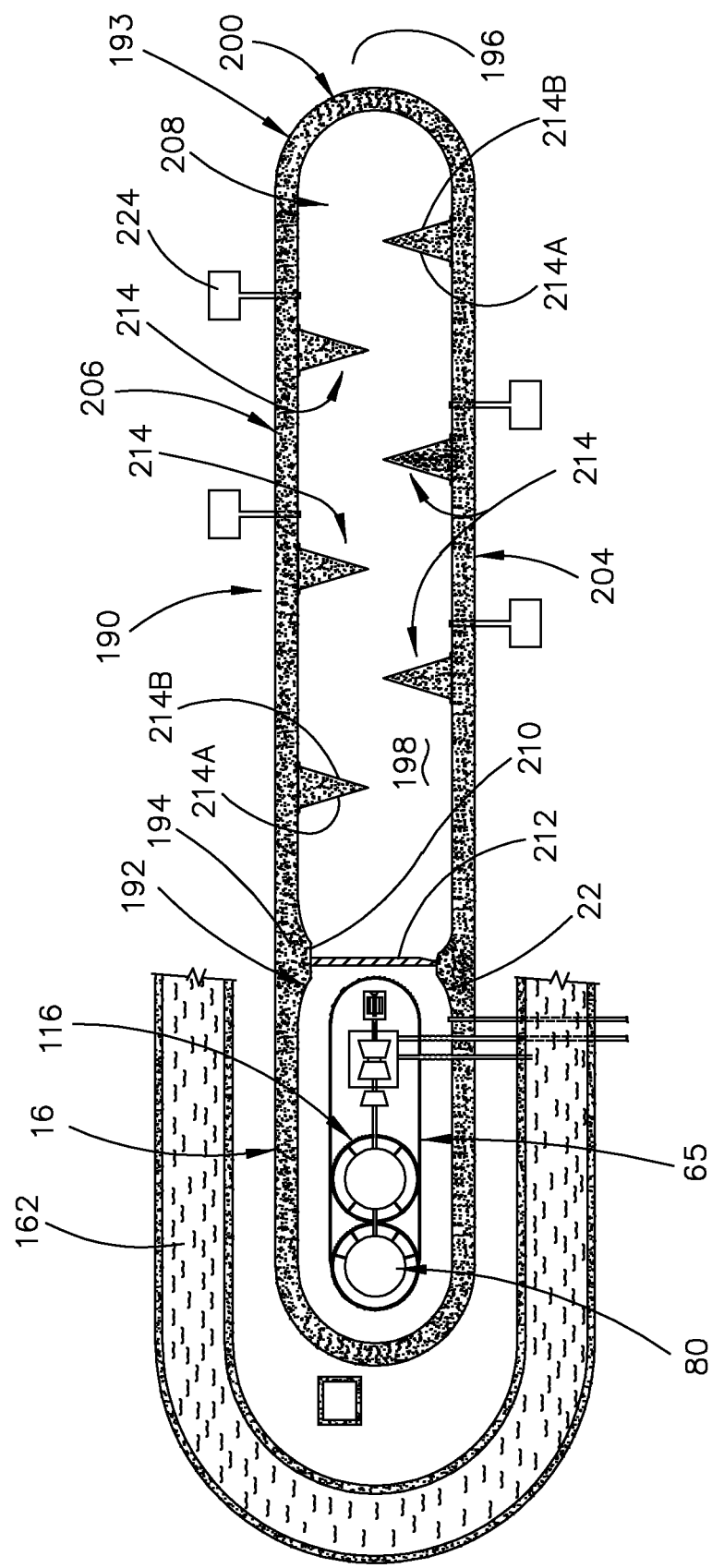
FIG. 8 is a partial upper sectional view of the instant invention extending from the invention of the pending application.
Figure 8A:
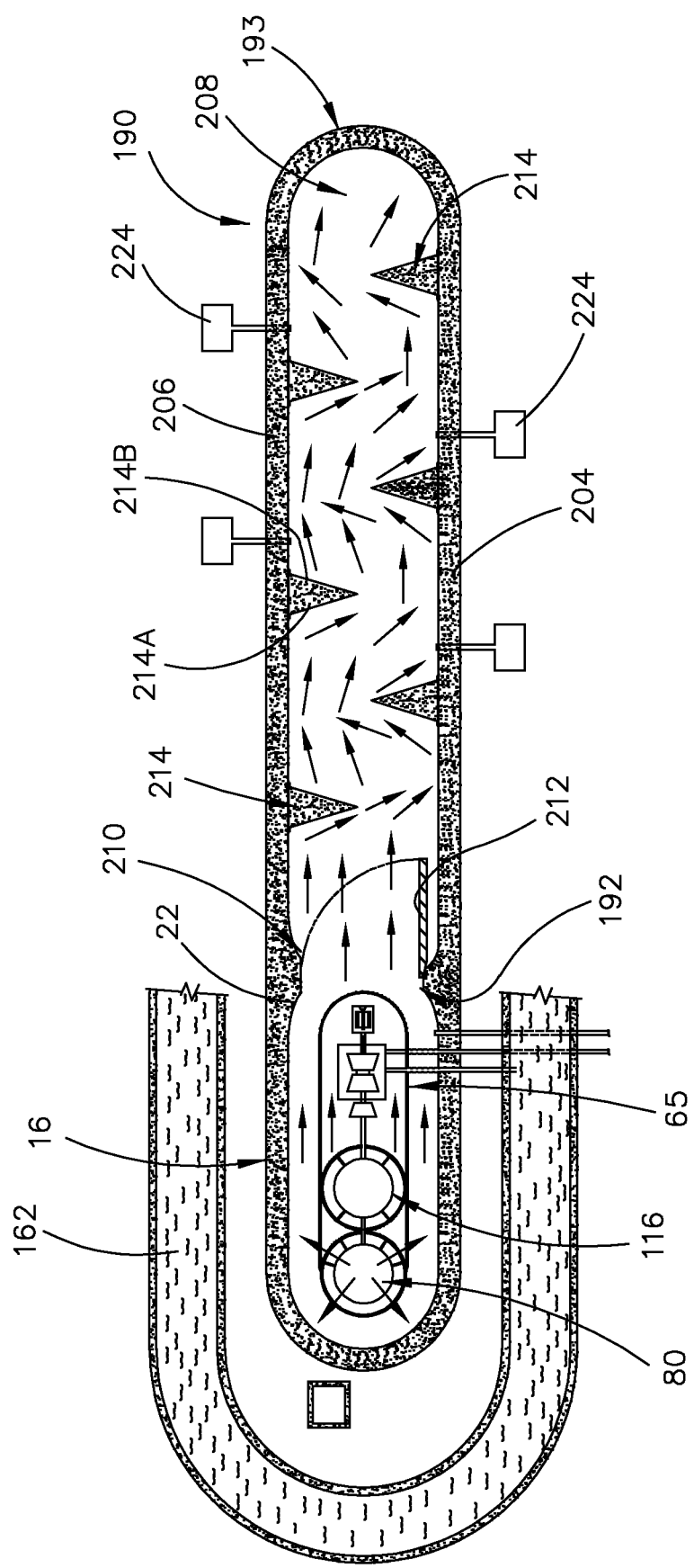
FIG. 8A is a partial upper sectional view similar to FIG. 8 except that the nuclear power reactor has experienced an explosion or blast which has opened the door to the blast chamber.
Figure 8B:
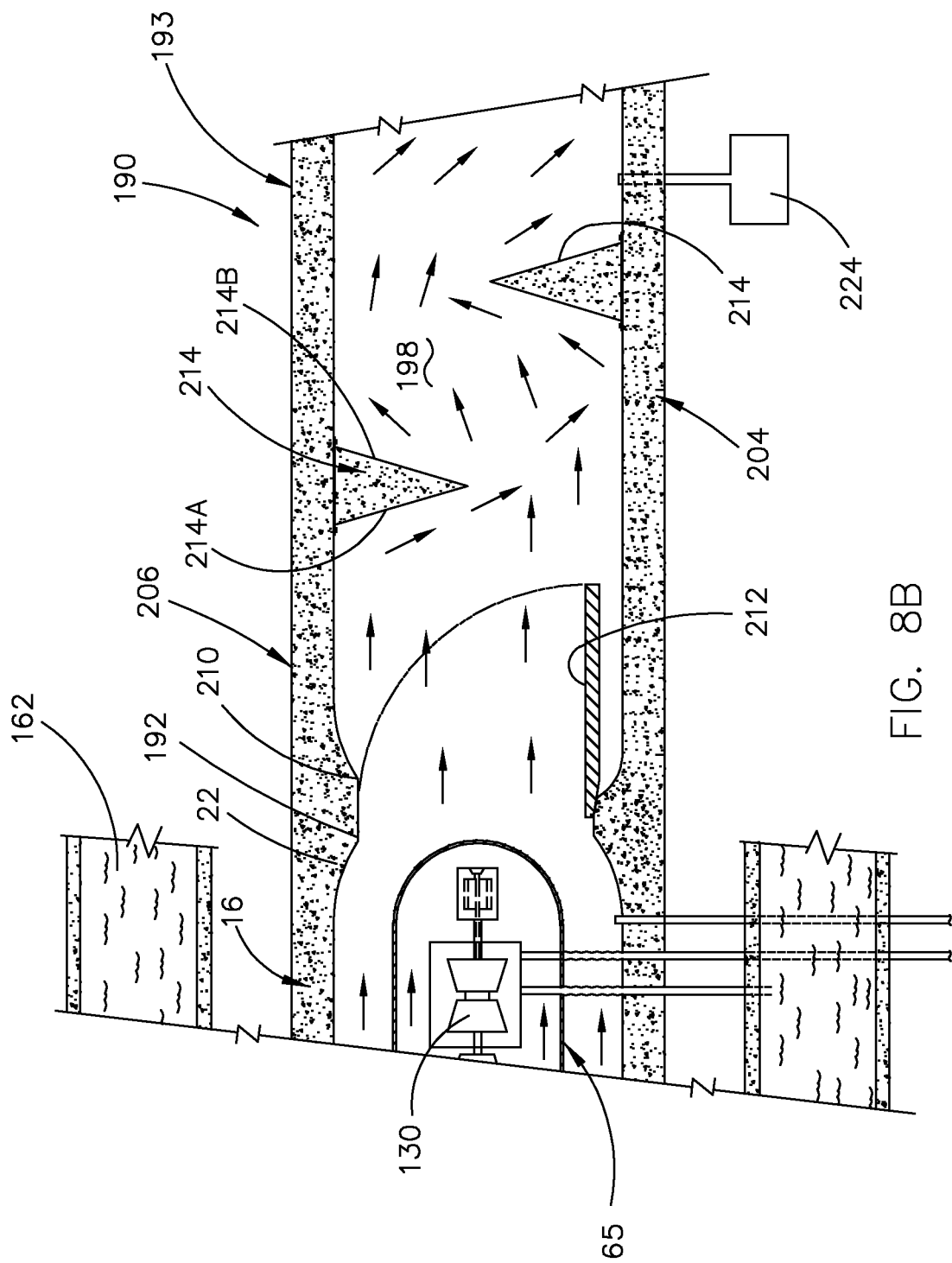
FIG. 8B is a partial upper sectional view similar to FIG. 8A.
Figure 9:
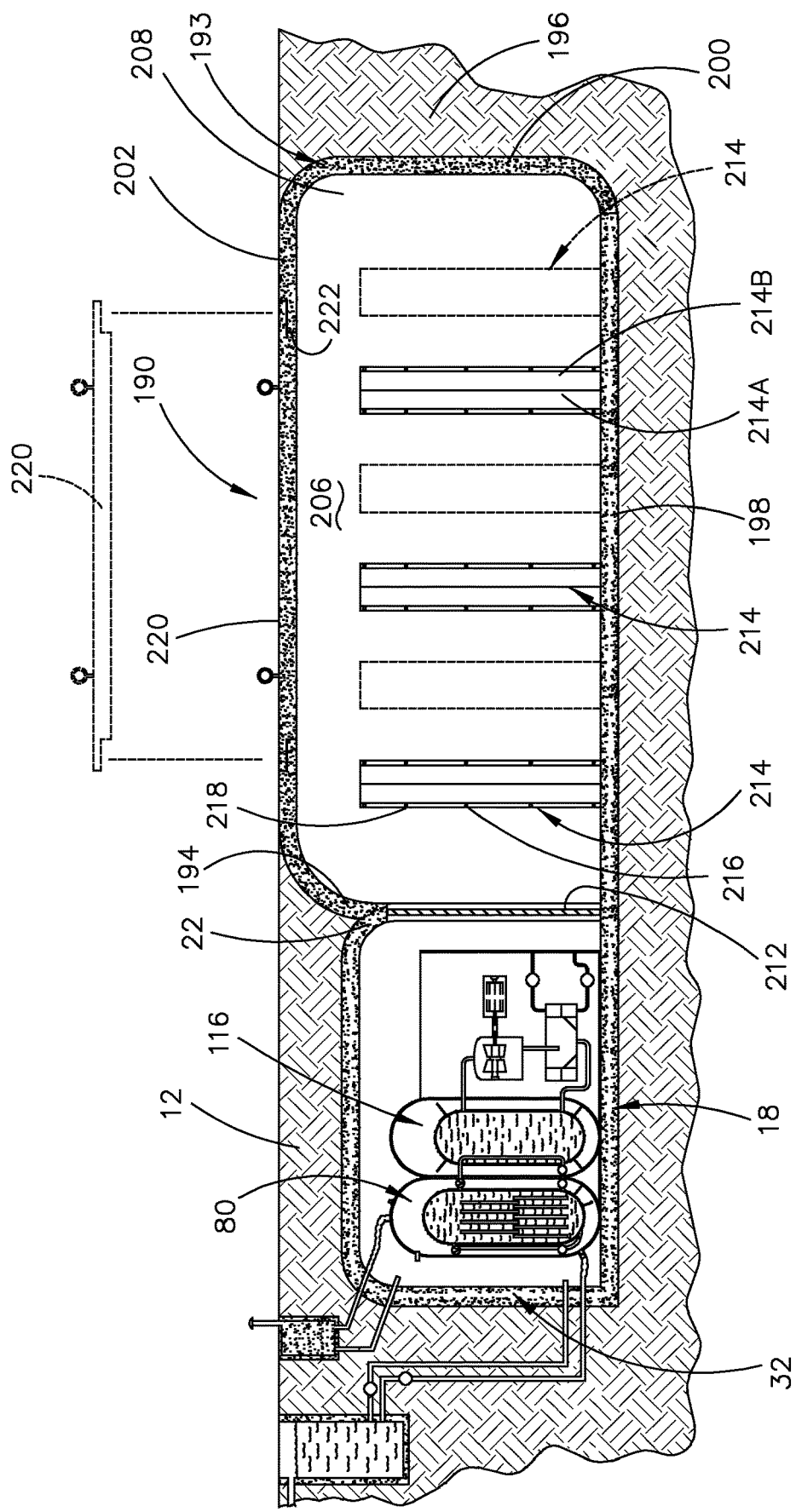
FIG. 9 is a partial side sectional view of the application and instant invention and which shows the roof section of the blast chamber in dashed lines having been raised from the blast chamber.
Figure 9A:
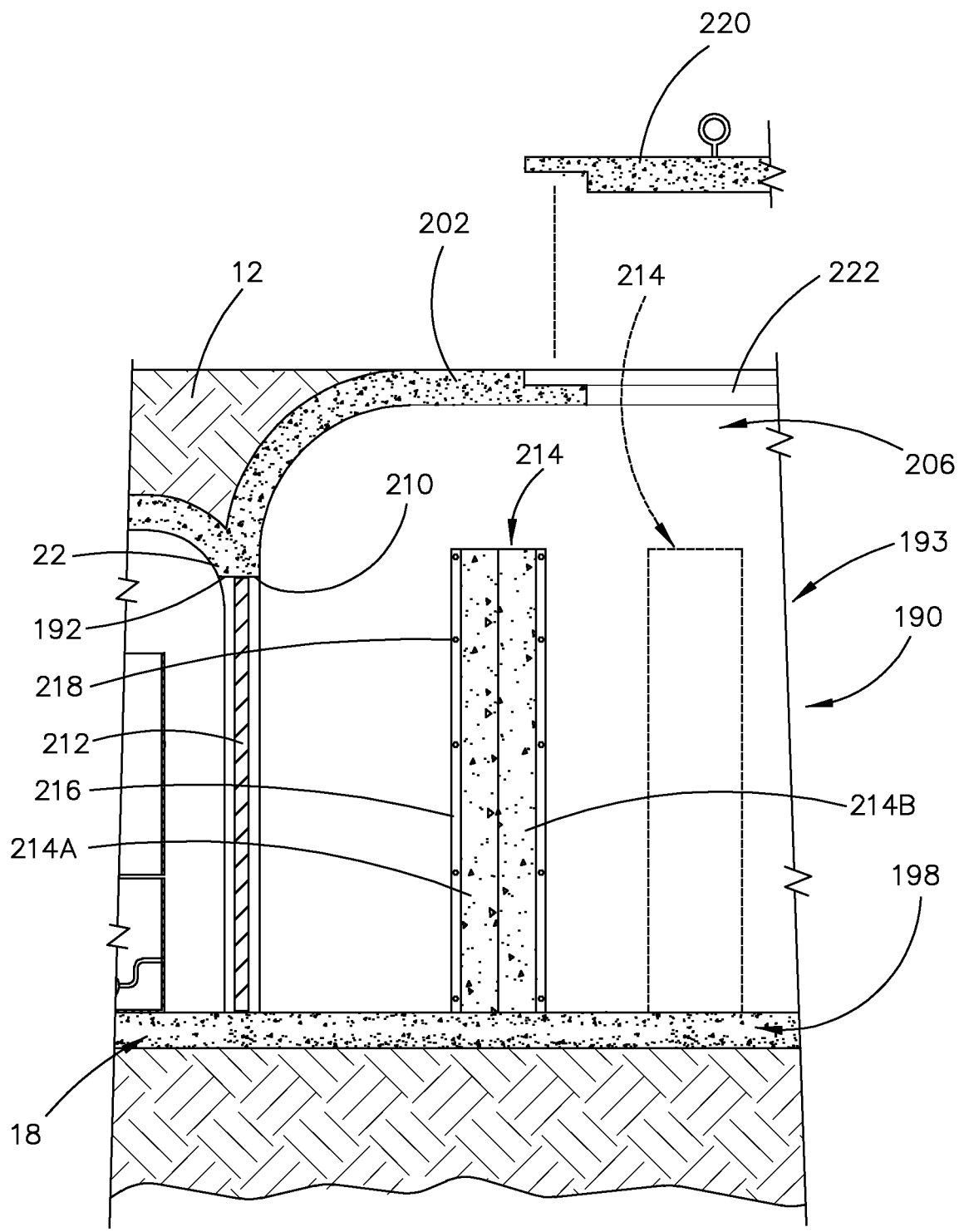
FIG. 9A is a partial side sectional view similar to FIG. 9.
Figure 10:
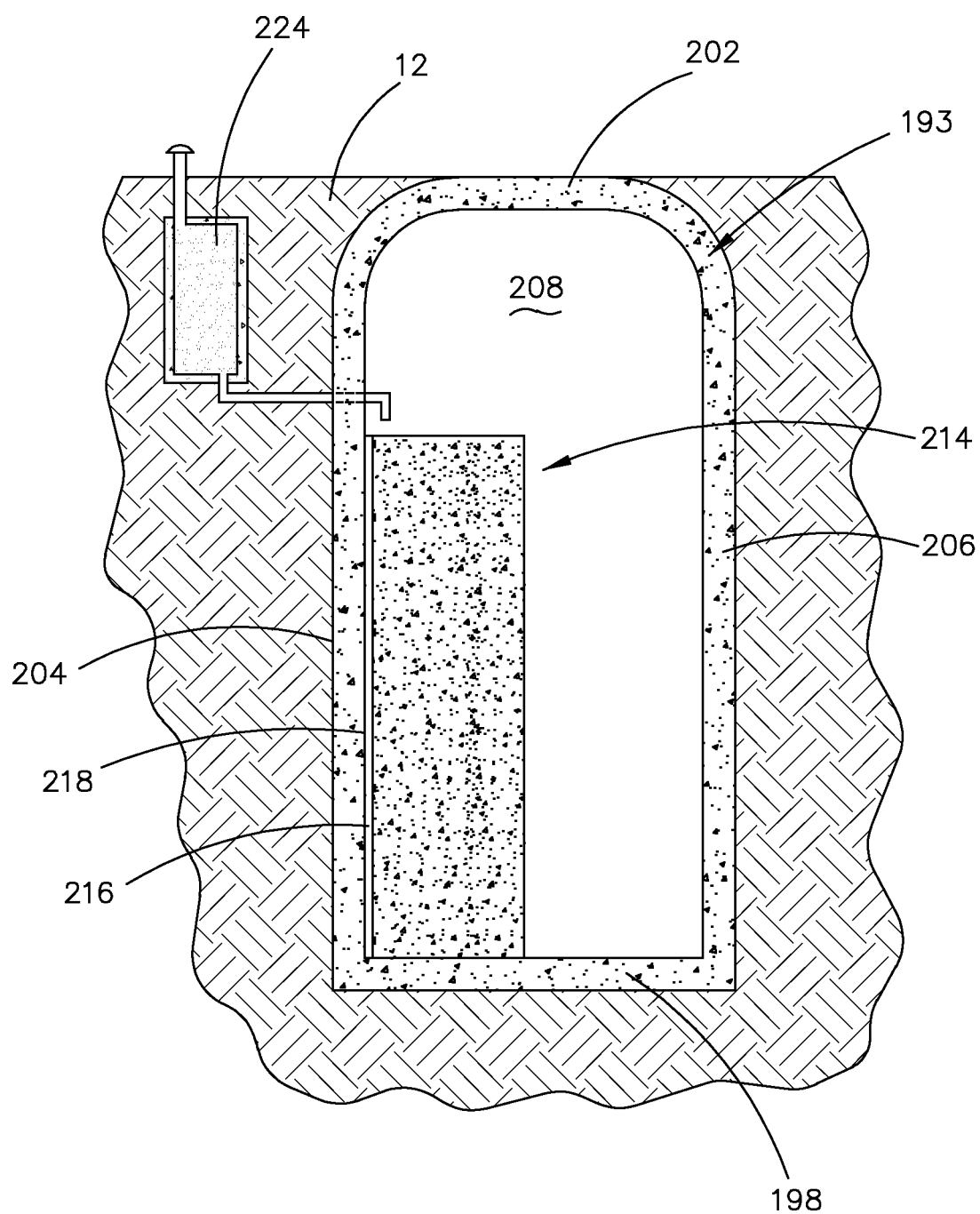
FIG. 10 is a partial end sectional view of the blast chamber.

The reference numeral 190 refers to the blast mitigation assembly of the instant invention. The underground nuclear reactor of the pending application is modified somewhat to accommodate the connection of the blast mitigation assembly thereto. The end wall 22 of containment member 16 is partially cut-away to form a door opening 192 therein which is large enough to permit the nuclear reactor 80, heat exchanger 116 and related equipment to be moved therethrough for purposes of repair or replacement. The right ends of the source of water 162, as viewed in FIGS. 8, 8A and 8B, is removed with the right ends of the source of water 162 being sealed or closed.

Blast mitigation assembly 190 includes an elongated hollow tunnel member 193 having an inner end 194 and an outer end 196. Tunnel member 193 includes a horizontally disposed bottom wall 198, an upstanding outer end wall 200, an upper wall 202, a first side wall 204 and a second side wall 206. The walls 198, 200, 202, 204 and 206 of tunnel member 193 defines an internal blast mitigation chamber 208. The inner end of blast mitigation chamber 208 has a door opening 210 formed therein which registers with the door opening 192 in containment member 16. A door 212 is hingedly mounted in the door openings 192 and 210 and is preferably comprised of steel. Door 212 is normally closed but may move to the open position as will be described in detail hereinafter.

A plurality of elongated and vertically disposed deflectors 214 are secured to the inside surface of wall 204 in a horizontally spaced-apart manner as seen in the drawings. A plurality of elongated and vertically disposed deflectors 214 are also secured to the inside surface of wall 206 in a horizontally spaced-apart manner as seen in the drawings. As seen, the deflectors 214, which extend inwardly from wall 204, are horizontally offset with respect to the deflectors 214 which extend inwardly from wall 206. Preferably, the deflectors 214 are comprised of concrete but may be comprised of steel or the like if so desired.

Preferably, each of the deflectors 214 have a triangular cross-section or trapezoidal cross-section which define an angular leading face 214A and a trailing face 214B. Preferably, the lower ends of the deflectors 214 rest on the upper side of the bottom wall 198. Preferably, the deflectors 214 are selectively secured to their respective side walls by flanges 216 and bolts 218. The inner ends of the flanges 216 are embedded in the respective deflector 214 with the outer ends thereof being bolted to the respective side wall. The attachment of the deflector 214 to the respective side wall enables the deflectors to be removed from the chamber 208 to enable the interior thereof to be cleaned and to also move the nuclear power reactor therethrough for repair or replacement. The numeral 220 refers to a roof portion which selectively closes a roof opening 222 formed in upper wall 202. A plurality of radiation filters 224 are in communication with the blast mitigation chamber 208 to filter and vent the blast mitigation chamber 208 of radiation.

There comes a time when the reactor 80 and the heat exchanger 116 must be repaired or replaced. In such a case, the roof portion 220 is raised to open the roof opening 222. The door 212 will then be moved to its open position. Normally, the deflectors 214 on the walls 204 and 206 will be removed from the blast chamber 198 so that the reactor 80, etc., may be removed from containment member 16. The reactor 80 etc. are then moved through door openings 192 and 210, through blast chamber 208 and outwardly through roof opening 222 for repair or replacement.

Door 212 includes a closing mechanism which is designed to let door 212 to open when the door 212 is subjected to a pre-determined blast pressure should the reactor shatter due to being over-pressurized. The shattering of the reactor also causes the shattering and mangling of the other components in the containment member 16 such as steam generator, turbine, generator, condenser and supporting structure. The shattered reactor and components associated therewith strike the door 212, which is opened by the blast forces, whereby the mangled pieces of the reactor and other components to be blasted through the door openings 192 and 210 and into the blast mitigation chamber 208.

The pressure waves and the shattered pieces of the reactor strike the innermost deflector 214 on wall 204 thereby causing some reduction in the blast force. The shattered pieces of the reactor and components are re-directed to the next deflector 214 on wall 206 and thence back and forth to the deflectors 214 to the end of the chamber 208 whereby the blast forces are reduced each time the shattered pieces strike the leading faces of the deflectors 214. Eventually, the blast force is reduced to a safe level so that roof portion 220 may be opened so that the blast mitigation chamber 208 may be cleaned and so that the containment member 16 may also be cleaned. The radiation filters 224 filter and vent the blast chamber 208 of radiation. The radiation filters 224 also reduce the pressure within the blast chamber 208 somewhat.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. An underground nuclear reactor, comprising:
a containment member including:
(a) a bottom wall having a first end, a second end, a first side, a second side, an upper side and a lower side;
(b) an upstanding first end wall having a lower end, an upper end, an inner side, an outer side, a first end and a second end;
(c) said first end wall extending upwardly from said first end of said bottom wall;
(d) an upstanding second end wall having a lower end, an upper end, an inner side, an outer side, a first end and a second end;
(e) said second end wall extending upwardly from said second end of said bottom wall;
(f) said second end wall of said containment member having a door opening formed therein;
(g) a door movably positioned in said door opening in said second end wall of said containment member with said door being movable from a normally closed position to an open position when an explosion or blast occurs in the nuclear reactor;
(h) an upstanding first side wall having a lower end, an upper end, an inner side, an outer side, a first end and a second end;
(i) said first side wall extending upwardly from said first side of said bottom wall;
(j) an upstanding second side wall having a lower end, an upper end, an inner side, an outer side, a first end and a second end;
(k) said second side wall extending upwardly from said second side of said bottom wall;
(l) an upper wall having a first end, a second end, a first side, a second side, a lower side and an upper side;
(m) said upper wall extending between said upper ends of said first end wall, said second end wall, said first side wall and said second side wall so that said containment member defines an interior compartment therebetween; and
(n) said upper wall of said containment member being located below ground level whereby said containment member is completely buried in the ground;
a nuclear reactor positioned in said interior compartment of said containment member;
an elongated and hollow blast tunnel comprising:
(a) a bottom wall with a first end, a second end, a first side, a second side, an upper side and a lower side;
(b) an upstanding first side wall extending upwardly from said first side of said bottom wall with said first side wall having an upper end, a lower end, a first end, a second end, an inner side and an outer side;
(c) an upstanding second side wall extending upwardly from said second side of said bottom wall with said second side wall having an upper end, a lower end, a first end, a second end, an inner side and an outer side;
(d) a first end wall, having an upper end and a lower end, at said first end of said bottom wall and which has a door opening formed therein which communicates with said door opening in said second end wall of said containment member when said door is in said open position;
(e) a second end wall, having an upper end and a lower end, at said second end of said bottom wall which extends between said second ends of first and second side walls;
(f) an upper wall positioned at said upper end of said first end wall of said blast tunnel, said second end wall of said blast tunnel, said first side wall of said blast tunnel, and said second side wall of said blast tunnel; and
(g) said walls of said blast tunnel defining a blast chamber configured to receive debris from said nuclear reactor in the event that said nuclear reactor explodes thereby creating a blast force extending therefrom.

2. The underground nuclear reactor of claim 1 wherein said upper wall of said blast tunnel has a roof opening formed therein and wherein a roof portion is positioned on said blast tunnel and which is positioned in said roof opening to normally close said roof opening but which is selectively movable to an open position.

3. The underground nuclear reactor of claim 1 wherein a plurality of spaced-apart first deflectors are secured to said inner side of said first side wall of said blast tunnel so as to be partially in the path of debris passing through said blast tunnel from said first end of said blast tunnel towards said second end of said blast tunnel and wherein a plurality of spaced-apart second deflectors are secured to said inner side of said second side wall of said blast tunnel so as to be partially in the path of debris passing through said blast tunnel from said first end of said blast tunnel towards said second end of said blast tunnel.

4. The underground nuclear reactor of claim 3 wherein said first deflectors are vertically disposed and horizontally spaced-apart and wherein said second deflectors are vertically disposed and horizontally spaced-apart.

5. The underground nuclear reactor of claim 4 wherein each of said first and second deflectors has an angular shape.

6. The underground nuclear reactor of claim 3 wherein said first and second deflectors are comprised of a concrete material.

7. The underground nuclear reactor of claim 3 wherein said first and second deflectors are selectively removably secured to said first and second side walls of said blast tunnel respectively.

8. The underground nuclear reactor of claim 3 wherein each of said first and second deflectors have upper and lower ends with said lower ends thereof being positioned on said upper side of said bottom wall of said blast tunnel.

9. The underground nuclear reactor of claim 3 wherein each of said first and second deflectors have a leading face which is disposed at an angle with respect to the longitudinal axis of said blast tunnel.

10. The underground nuclear reactor of claim 1 wherein said containment member is comprised of a concrete material.

11. The underground nuclear reactor of claim 1 wherein said blast tunnel is comprised of a concrete material.

12. The underground nuclear reactor of claim 1 wherein said door openings are large enough to permit said nuclear reactor to pass therethrough for repair or replacement.

13. The underground nuclear reactor of claim 2 wherein said roof opening is large enough to permit said nuclear reactor to pass therethrough for repair or replacement.

14. The underground nuclear reactor of claim 1 wherein said door is selectively movable from said closed position to said open position.

15. An in-ground nuclear power reactor, comprising:
a containment member having a wall, a bottom wall, a first end wall, a second end wall, a first side wall, a second side wall, an upper wall and an interior compartment;
a nuclear reactor positioned in said interior compartment of said containment member;
said second end wall of said containment member having a door opening formed therein;
a hollow blast tunnel having a first end wall, a second end wall, a first side wall having inner and outer sides, a second side wall having inner and outer sides, a bottom wall, an upper wall and a blast mitigation chamber;
said first end wall of said blast tunnel having a door opening formed which communicates with said door opening in said second end wall of said containment member;
a door movably positioned in said door openings; and
said door being normally closed but being movable to an open position upon a predetermined blast force being exerted thereon should the nuclear reactor explode whereby debris from said exploded nuclear reactor will pass through said door openings into said blast mitigation chamber.

16. The in-ground nuclear power reactor of claim 15 wherein a plurality of spaced-apart first deflectors are mounted on said inner side of said first side wall of said blast tunnel and wherein a plurality of spaced-apart second deflectors are mounted on said inner side of said second side wall of said blast tunnel.

17. The in-ground nuclear power reactor of claim 16 wherein said second deflectors are off-set with respect to said first deflectors.

18. The in-ground nuclear power reactor of claim 16 wherein said first and second deflectors are selectively removably secured to said inner sides of said first and second side walls of said blast tunnel.

19. The in-ground nuclear power reactor of claim 15 wherein said upper wall of said blast tunnel has an opening formed therein which is selectively closed by a roof portion.

20. The in-ground nuclear power reactor of claim 15 wherein said door openings are large enough to permit said nuclear reactor to pass therethrough.

21. The in-ground nuclear power reactor of claim 19 wherein said opening in said upper wall of said blast tunnel is large enough to permit said nuclear reactor to pass therethrough.

* * * * *